(No Model.) 2 Sheets—Sheet 1.

L. W. MOZINGO & I. STIERS.
FILTER.

No. 396,287. Patented Jan. 15, 1889.

Witnesses
Geo. J. Thorpe
R. W. Bishop

Inventors
Lewis W. Mozingo
Isaac Stiers
By their Attorneys
C. A. Snow & Co.

(No Model.) 2 Sheets—Sheet 2.

L. W. MOZINGO & I. STIERS.
FILTER.

No. 396,287. Patented Jan. 15, 1889.

Witnesses
Geo. Y. Thorpe
R. W. Bishop

Inventors
Lewis W. Mozingo
Isaac Stiers
By their Attorneys
C. A. Snow & Co.

UNITED STATES PATENT OFFICE.

LEWIS W. MOZINGO AND ISAAC STIERS, OF KANSAS CITY, MISSOURI.

FILTER.

SPECIFICATION forming part of Letters Patent No. 396,287, dated January 15, 1889.

Application filed October 2, 1888. Serial No. 286,986. (No model.)

*To all whom it may concern:*

Be it known that we, LEWIS W. MOZINGO and ISAAC STIERS, citizens of the United States, residing at Kansas City, in the county of Jackson and State of Missouri, have invented a new and useful Improvement in Filters, of which the following is a specification.

Our invention relates to an improvement in filters; and it consists in certain novel features hereinafter described and claimed.

The object of our invention is to provide a filter by which rain-water will be cleansed of its impurities before passing into the cistern and by which the filter will be automatically cleaned when the rain has ceased falling.

Figures 1, 2, 3:
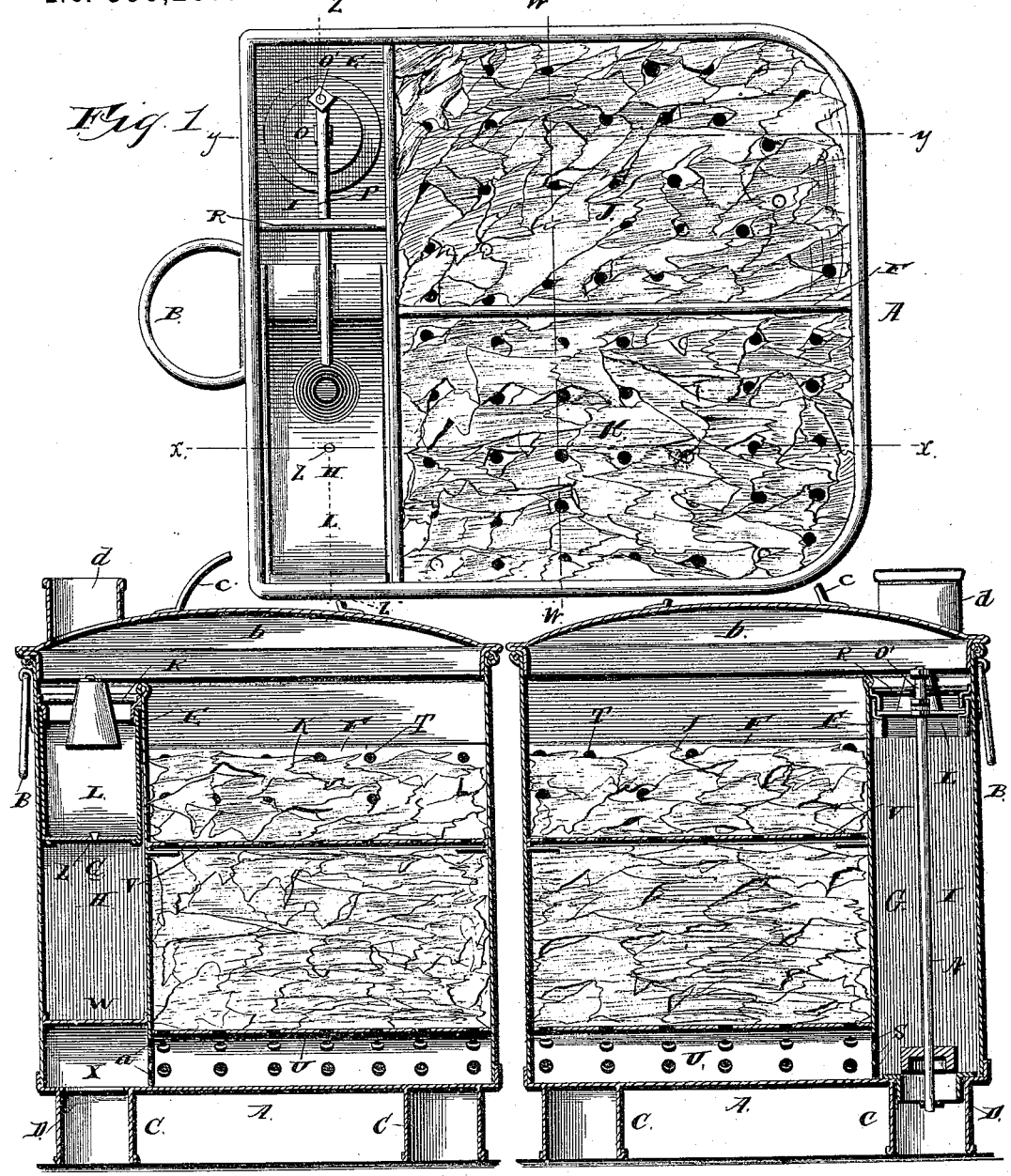
Figure 4:
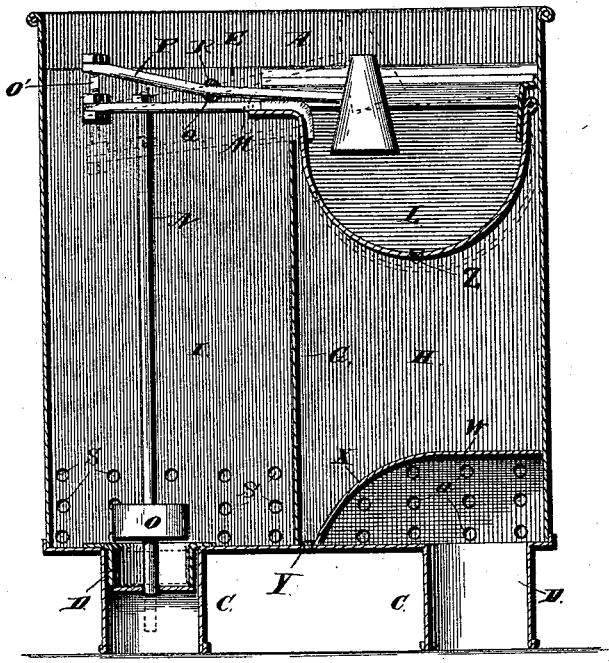
Figure 5:
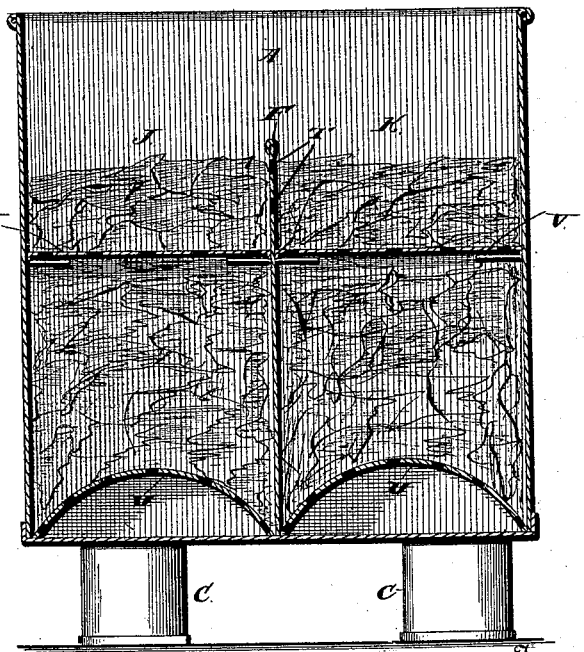

In the accompanying drawings, which fully illustrate our invention, Fig. 1 is a plan view of our improved filter with the top removed. Fig. 2 is a vertical section on the line $x\,x$ of Fig. 1. Fig. 3 is a sectional view on the line $y\,y$ of Fig. 1. Fig. 4 is a section on the line $z\,z$ of Fig. 1, and Fig. 5 is a section on the line $w\,w$ of Fig. 1.

Referring to the drawings by letter, A designates the casing of any desired size and constructed of any suitable material. The casing is provided on its rear side near its top with a suspending loop, B, by means of which it may be suspended from a side of a house, as will be readily understood. The casing is further provided on its bottom with the legs C, which are adapted to support it when it is not suspended by means of the loop B. In the bottom of the casing, at the rear corners, we provide the openings D, which communicate with the rear legs, the purpose of which will hereinafter appear.

Within the casing we arrange the transverse and longitudinal partitions E F, the partition E being arranged parallel with and adjacent to the rear end of the casing, and the partition F being arranged in the center of the casing and extending from the medial line of the partition E to the front end of the casing. Between the partition E and the rear end of the casing we arrange a vertical partition, G, which terminates below the upper edge of the partition E and about on a line with the upper edge of the partition F. The casing is thus divided into four compartments, H I J K, as shown.

Extending across the upper end of the compartment H is a bucket, L, which is pivoted at one end to the sides of the casing, and has its other end adapted to rest on the upper edge of the partition G. To the free end or edge of the bucket is secured an arm, M, which extends over and into the compartment I, and is connected to the upper end of a valve-rod, N, having a valve, O, on its lower end adapted to close the opening D in the bottom of the casing, as shown. The arm M is extended beyond the valve-rod N a short distance, and is connected by means of a link, O', with the rear end of a lever, P, which extends through and plays in a slot, Q, of a transverse bar or rod, R, secured between the partition E and the rear end of the casing, as shown. The free end of the lever is weighted, and is arranged over the bucket L. Near its lower edge, at the bottom of the compartment I, the partition E is provided with a series of perforations, S, and near its upper edge the partition F is provided with a series of perforations, T.

Within the compartments J K we arrange the horizontal perforated shelves or plates U V, and the spaces between the shelves U V and over the shelves V are filled with gravel, charcoal, or similar filtering material.

Within the compartment H, at the lower end of the same, we arrange the horizontal partition W, the inner end of which is bent downward, as shown at X, leaving a small space between the same and the partition G. In the bottom of this space we form an escape-opening, Y, and in the bottom of the bucket L we form an escape-opening, Z.

The partition E is provided below the plane of the horizontal partition W with a series of perforations, $a$, which allow the water to pass into the space below the said horizontal partition and thence through the opening D and through the conducting-pipe to the cistern.

$b$ designates the lid or cover, which is provided with a handle, $c$, to facilitate its removal, and is further provided with an inlet-opening, $d$, which communicates with the rain-spout or other feed-pipe.

In operation the rain-water is admitted to the bucket L, and the weight of the said water will cause the said bucket to swing downward on its pivot and operate arm M and the valve-rod N to lower the valve O and thereby close the opening D. As the water continues to enter the bucket, it will overflow into the compartment I, thence through the perforations in the lower portion of the partition E into the compartment J, after which it will rise through said compartment and the filtering material therein and flow over the partition F and through the perforations in said partition into the compartment K. It will then pass downward through said compartment K and the filtering material therein to the openings a, through which it will pass into the space below the horizontal partition W, and thence out through the conducting-pipe to the cistern. When the cistern has been filled, the supply of water is cut off and the weight on the end of the lever P will cause said lever to oscillate so as to raise the valve O, so as to allow the water to escape, it being understood, of course, that the weight on said lever is heavy enough to raise the bucket as soon as it is relieved of the weight of the falling column of water. The plug in the opening Z in the bottom of the bucket L is then removed, allowing the waste water and impurities which collect in the bucket to pass downward and out of the casing through the opening Y in the bottom of the same onto the ground. It will thus be seen that the filter is quickly discharged of the impurities collected therein, and that it thoroughly and efficiently cleanses the water.

Our device is composed of few parts, and those few are simple in construction, so that the device can be manufactured at a small cost. The several parts are all inclosed in a casing, so as to protect them from injury, while at the same time ready access may be had thereto for the purpose of renewing the filtering material or otherwise repairing it.

Having thus described our invention, what we claim, and desire to secure by Letters Patent, is—

1. A filter comprising a casing, intersecting transverse and longitudinal partitions within the single casing, dividing the interior thereof into four compartments, a bucket pivoted in the upper end of one of the compartments formed by the partitions, a valve in the lower end of the next adjacent compartment, and connections between the valve and the bucket, as set forth.

2. A filter comprising a single casing, vertical partitions within the casing arranged at right angles to each other and dividing the interior of the casing into the compartments H I J K, the water being received in the upper end of the compartment H, and passing thence successively through the compartments I J K back into the lower end of the first compartment, H, the bucket pivoted in the upper end of the compartment H to receive the water, and the valve in the lower end of the adjacent compartment, I, controlled by the bucket to discharge the surplus water, as set forth.

3. A filter having the compartments H I at one end, the compartment H, having an escape-opening, Y, in its bottom, and the compartment I, having a discharge-opening, D, in its bottom, the bucket in the upper end of the compartment H, having an escape-opening, Z, in its bottom, and the valve in the lower end of the compartment I, controlled by said bucket, and adapted to close the discharge-opening D, as set forth.

4. A filter comprising the casing, the transverse partition E, near the rear end of the same, having perforations in its lower portion, the imperforate partition G between the partition E and the casing and forming the compartments H I, the supply-opening being over the upper end of the compartment H and the discharge-opening in the lower end of the same, the compartment I, having an opening, D, in its bottom, the longitudinal partition extending from the partition E to the front end of the casing and having a perforated upper portion and forming the compartments J K, the perforated shelves in the said compartments J K, adapted to support filtering material, and the horizontal imperforate partition in the lower end of the compartment H, over the discharge-opening, as set forth.

5. The combination of the casing having the compartments H I near one end, the compartment I, having an opening in its bottom, the valve O, adapted to close said opening, the bucket pivoted in the upper end of the compartment H, the arm M, projecting from the bucket over the upper end of the compartment I, the valve-rod rising from the valve O and having its upper end secured to an intermediate point of the arm M, the transverse rod R, the weighted lever playing through said rod, and the link connecting the end of said lever with the end of the arm M, as specified.

In testimony that we claim the foregoing as our own we have hereto affixed our signatures in presence of two witnesses.

LEWIS W. MOZINGO.
ISAAC STIERS.

Witnesses:
D. H. PORTER,
GARRETT ELLISON.